May 13, 1958  R. M. WHITE  2,834,867
RESISTANCE HEATING ELEMENT
Filed Nov. 2, 1956

Inventor
ROBERT M. WHITE

United States Patent Office 2,834,867
Patented May 13, 1958

2,834,867

RESISTANCE HEATING ELEMENT

Robert M. White, Waukegan, Ill., assignor to The Chicago Hardware Foundry Company, North Chicago, Ill., a corporation of Illinois Application November 2, 1956, Serial No. 619,984

3 Claims. (Cl. 219—39)

This invention relates to an electrical resistance heating element, and more specifically to the type of resistance heating element which is particularly useful in small forced air appliances.

Applicances of the type to which the instant invention are particularly useful are typically made quite small, either so that they may be hand held or that they may occupy little space. A relatively small size also minimizes the quantity of materials used in such devices. When these devices include an electrical heating resistance element, it is therefore necessary that the element be small enough to conform to the size permitted by the overall design, and yet have a high heat output. When designing a small unit of the type contemplated, the designer runs into numerous difficulties. Among these are that localized hot spots develop which cause a burn-out of the element. Another problem is that the air is either not heated sufficiently or is heated non-uniformly. Another problem is the difficulty attendant to installing the unit in the appliance in such a manner that the high heat output will not destroy the electrical leads to the element, or the element itself.

Accordingly an element has been invented which overcomes all these problems. Briefly, one embodiment of this invention includes a heating element which has two staggered layers of coiled uniformly wound heater wire mounted on an insulated and heat resistant frame.

Therefore, it is an object of this invention to provide a compact, efficient, and reliable electrical resistant heating element.

It is a further object of this invention to provide a resistance heating element which uniformly heats the air.

Another object of this invention is to provide a heating element which is exceptionally reliable.

A still further object is the provision of a heating element which operates more efficiently than others heretofore available.

Yet another object is the provision of a thermally protected heating element for an air heating appliance.

Other objects, features and advantages of this invention will be apparent from the following detailed description of the attached sheet of drawings, which, by way of a single preferred embodiment, illustrates the invention.

Figure 1:
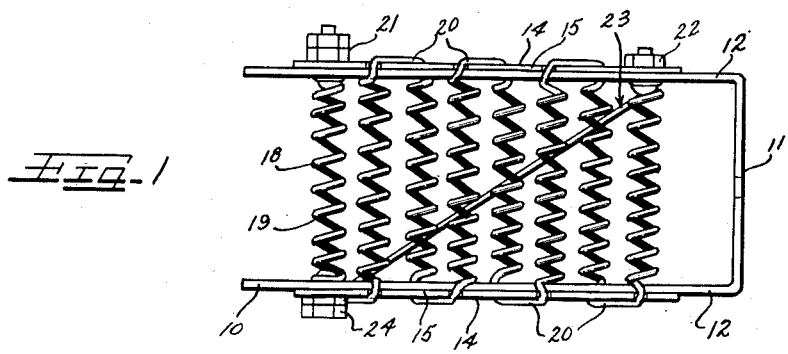
Figure 1 is a front view of the electrical heating element.

Figure 1 shows a front view of the heating element. In this embodiment, the element comprises a U-shaped base 10 having a mounting portion 11 and a pair of legs 12 joined thereto. While the frame has been illustrated as preferably being U-shaped, it will be apparent that it could also be H-shaped, V-shaped, C-shaped or O-shaped. The base may be made from any heat resistant material having the other necessary physical properties, such as steel. Integral with the base 10 or, as shown, a pair of insulated coil supporting surfaces 14, secured to the base as by any suitable fastening means 13 such as eyelets or rivets, are provided. The two insulated coil supports or supporting surfaces are thus in spaced relation to each other and define a space therebetween. While mica has been found to be particularly advantageous in the instant embodiment, any other insulating material having the necessary thermal properties would also be satisfactory. It will be noted that each of the spaced surfaces 14 have edges 15 and 16 in which there are a plurality of notches 17. In the embodiment shown, the notches 17 are evenly spaced from each other along any one edge of the supporting surface 14. It will be noted also that the notches 17 along one edge of the supporting surface 14 are staggered with respect to the notches on the opposite edge of supporting surface 14. The amount of stagger is such that one series of notches is offset from the other by an amount equal to approximately one-half of the space between a pair of notches. If desired, additional holes may be provided at the ends of the supporting surface 14 to receive terminals, eyelets, or the like for use in making electrical connection to the heater wire.

Figure 2:
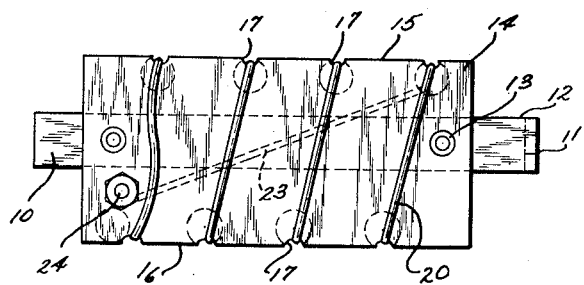
Figure 2 is a side view of the element of Figure 1.
Figure 3:
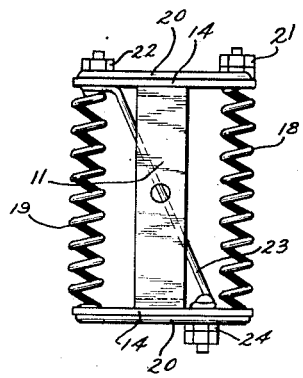
Figure 3 is an end view of the heating element.

The heater wire 18 may be wound about the pair of spaced opposed supporting surfaces, resting in notches 17 and terminating in terminals. It is also possible to first coil the wire as shown in Figures 1 and 3, into a long helix and to wind such helix in the same manner as a straight wire might be wound. However, a preferred form is to combine these two methods of winding so that the wire 18 is coiled where it is spanning the space between the two spaced supporting surface 14, and so that it is straight as it goes from one notch 17 to another notch 17 on the same supporting surface. Figure 1 clearly shows the coiled heater portions 19 spanning the space between the supporting surfaces 14, while Figure 2 clearly shows non-coiled heater portions 20. Any suitable resistance wire may be used, however nichrome works very well.

It will be observed that the winding may be said to begin at terminal 21 located on one of the opposed and spaced legs or members of the base 10, or more specifically on one of the supporting surfaces 14, and to extend in coiled fashion as shown in Figure 1, to the opposite end of the frame, crossing or spanning the space between the supporting surfaces 14, in the illustrated embodiment, eight times. After having crossed the span each time, the winding is directed to the opposite edge of the supporting surface 14. By such winding, the turns define two planes or layers of heating elements which are uniformly wound and wherein one layer is staggered with respect to the other. It will be noted that the winding then terminates at terminal 22. It is desirable to have the leads coming to the element to be located adjacent one another. However the heat of the element is such that the insulation can not withstand the heat given off. Accordingly there is provided a connector wire 23 extending from terminal 22 to terminal 24. This connector wire is a relatively heavy gauge bare copper wire which lies in the volumetric space defined by the two layers of heating wire and the spaced surfaces 14. This is most clearly shown in Figure 3. It has been found that No. 18 gauge bare solid copper wire is quite satisfactory for this purpose. Thus it is apparent that the lead to terminal 24 does not need to pass through the heated air stream, and thereby damage to its insulation is avoided.

Figure 4:
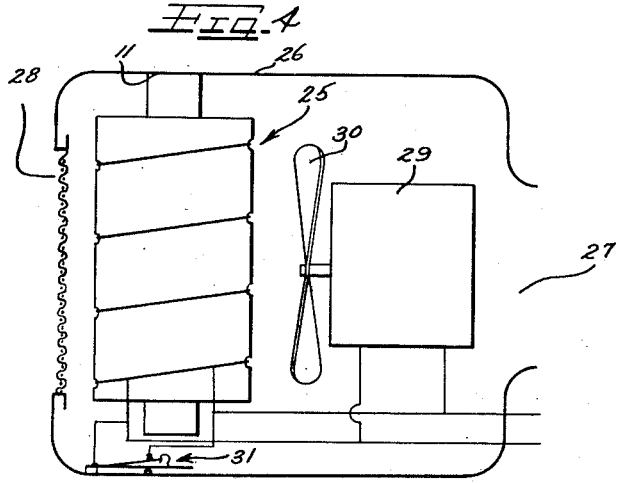
Figure 4 illustrates how the element may be installed in an air heating appliance.

Referring to Figure 4, the assembled heating unit or element is shown installed in an air heating appliance. The element as a whole 25 is mounted at the mounting means or portion of the base 11 to the housing 26. In the form illustrated there is an air inlet 27 and a discharge outlet 28. A motor 29 drives the fan 30 which is positioned to move air from the inlet across the motor and the fan and through the heating element 25 which is positioned downstream of the fan and generally transverse to the air flow produced by the fan. A snap action thermostat or high temperature limit switch 31 is located physically near the element so that it may detect any excessive temperature condition. Since it is connected in series with the power leads to the element 25, overheating, due to any condition, will be detected, and the appliance accordingly protected.

In preferred installations, the air is directed at essentially right angles to the layers of heater wire 18. By using straight uncoiled wire near the outer edges of the air flow, where the air velocity is the lowest, hot spots will not develop. By using coiled heater portions to span the space between the supporting surfaces 14, a maximum of heat is produced at the center of the air passage where the air velocities are the highest. By having staggered spaced layers of coiled heater wire at the center, a uniformly dense glowing front is presented to heat the air. This structure obviously will heat the air to a very uniform extent and also quite substantially. This design produces a maximum of spacing between the coils which prevents dielectric break-down, and detrimental radiant interaction between the coils. The location and composition of connector wire 23 is also advantageous, in that this design permits of placing of terminals 21 and 24 relatively near each other and accessible to the insulated wire as clearly shown in Figure 4.

The instant design has achieved a degree of efficiency which has not heretofore been obtained. Tests indicate that the same temperature of the air stream may be obtained as has been obtained with previous elements, however by using 30% less current. Thus it is apparent that the design is somewhat more efficient. In part, this efficiency is obtained by better coverage of the discharge air stream, thereby insuring a heating of a greater percentage of the air.

It will be understood that modifications and variations may be effected without departing from the scope of the present invention, but it is understood that this application is to be limited only by the scope of the appended claims.

I claim as my invention:

1. A heating element, comprising in combination: an elongated U-shaped supporting base adapted for being mounted at its bight; a pair of opposed flatwise-spaced electrically insulative sheets each secured to only one leg of said base and lying in separate spaced planes defining a volumetric space therebetween; a heater wire uniformly externally wound directly around said spaced sheets and cooperating in the defining of said volumetric space, one end of said heater wire terminating adjacent to the bight of said U-shaped base and the other end terminating remotely therefrom; and a connector wire disposed within said volumetric space in spaced relation to said heater wire, one end of said connector wire communicating with said other other end of said heater wire, and the other end of said connector wire terminating adjacent to the bight of said U-shaped base.

2. A heating element comprising, in combination: a base having longitudinally extending spaced legs defining an opening therebetween; a pair of flatwise-spaced electrically insulative sheets each secured to only one of said legs, each of said sheets having a pair of spaced longitudinally extending edges, said four edges jointly defining a volumetric space having rectangular proportions and disposed between said legs; and a heater wire uniformly wound directly around said spaced sheets with a plurality of parallel portions longitudinally spaced from each other and extending from one of said edges of one of said sheets to a corresponding point on the corresponding edge of the other of said sheets, thereby spanning said space with two spaced layers of heater wire; one of said layers being longitudinally offset from the other layer transversely to said parallel portions by an amount equal to substantially one-half of the spacing between adjacent parallel portions to thereby minimize radiant coinfluence between adjacent portions of said heater wire.

3. A heating element, comprising in combination: an elongated U-shaped supporting base adapted for being mounted at its bight and having spaced legs longitudinally extending from the bight defining an opening therebetween; a pair of opposed flatwise-spaced electrically insulative sheets each secured to only one of said legs, each of said sheets having a pair of spaced longitudinally extending edges, said four edges jointly defining a volumetric space having rectangular proportions and disposed between said legs; a heater wire uniformly externally wound directly around said spaced sheets, said wire including a plurality of parallel portions longitudinally spaced from each other and extending from one of said edges of one of said sheets to a corresponding point on the corresponding edge of the other of said sheets, thereby spanning said space with two spaced layers of heater wire which cooperate with said sheets in the defining of said volumetric space, one of said layers being longitudinally offset from the other layer transversely to said parallel portions by an amount equal to substantially one-half of the spacing between adjacent parallel portions, one end of said heater wire terminating adjacent to the bight of said U-shaped base and the other end terminating remotely therefrom; and a connector wire disposed within said volumetric space in spaced relation to said heater wire, one end of said connector wire communicating with said other end of said heater wire, and the other end of said connector wire terminating adjacent to the bight of said U-shaped base.

References Cited in the file of this patent

UNITED STATES PATENTS

| 454,207 | Eickemeyer | June 16, 1891 |
| 540,244 | Gold | June 4, 1895 |
| 1,508,735 | Weiss | Sept. 16, 1924 |
| 1,998,670 | Goshorn et al. | Apr. 23, 1935 |
| 2,706,241 | Granger | Apr. 12, 1955 |